United States Patent [19]

Shoberg

[11] 3,956,930
[45] May 18, 1976

[54] DRIVELINE TORQUE AND/OR THRUST SENSOR

[75] Inventor: Ralph S. Shoberg, Farmington, Mich.

[73] Assignee: GSE, Inc., Farmington Hills, Mich.

[22] Filed: Sept. 23, 1974

[21] Appl. No.: 508,231

[52] U.S. Cl. ............................ 73/133 R; 73/136 B
[51] Int. Cl.² ........................................... G01L 3/14
[58] Field of Search .......... 73/133 R, 136 B, 136 C, 73/140, 136 A

[56] References Cited
UNITED STATES PATENTS

| | | | |
|---|---|---|---|
| 3,427,875 | 2/1969 | Saxl | 73/141 A |
| 3,620,073 | 11/1971 | Robbins | 73/133 |
| 3,728,896 | 4/1973 | Sheldon et al. | 73/136 C |
| 3,771,359 | 11/1973 | Shoberg | 73/141 A |

*Primary Examiner*—Charles A. Ruehl
*Attorney, Agent, or Firm*—Thomas N. Young

[57] ABSTRACT

A load cell for measuring the torque and/or thrust forces in a driveline having a universal coupling joint, such as the drive shaft of an automobile. The load cell is designed to replace the standard cross element in the U-joint. Due to the operative association of the load cell with the driveline and the particular strain gage arrangement disclosed, the load cell is capable of accurately measuring the axial force and rotational torque transmitted through the driveline.

8 Claims, 9 Drawing Figures

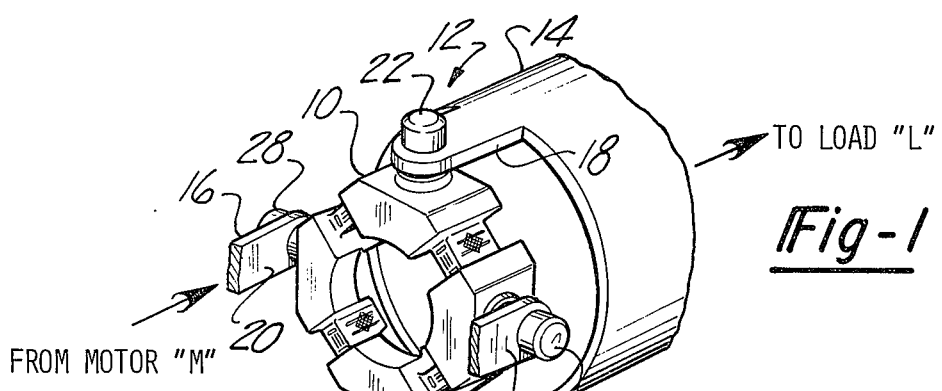
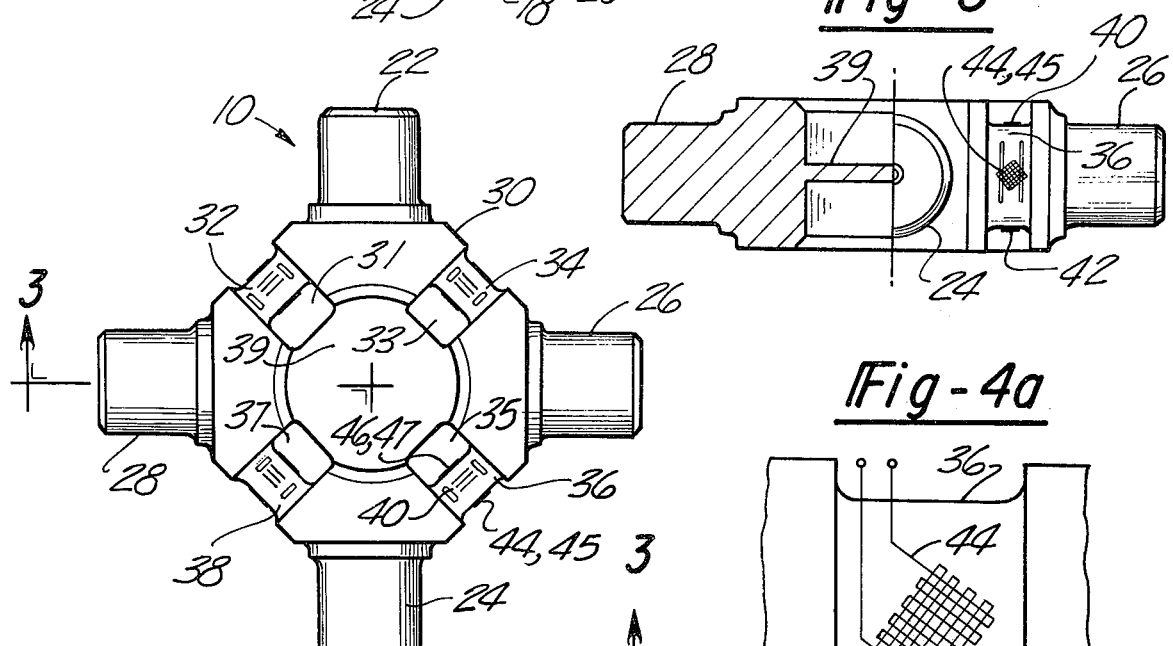
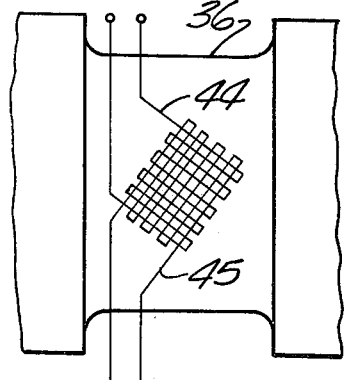
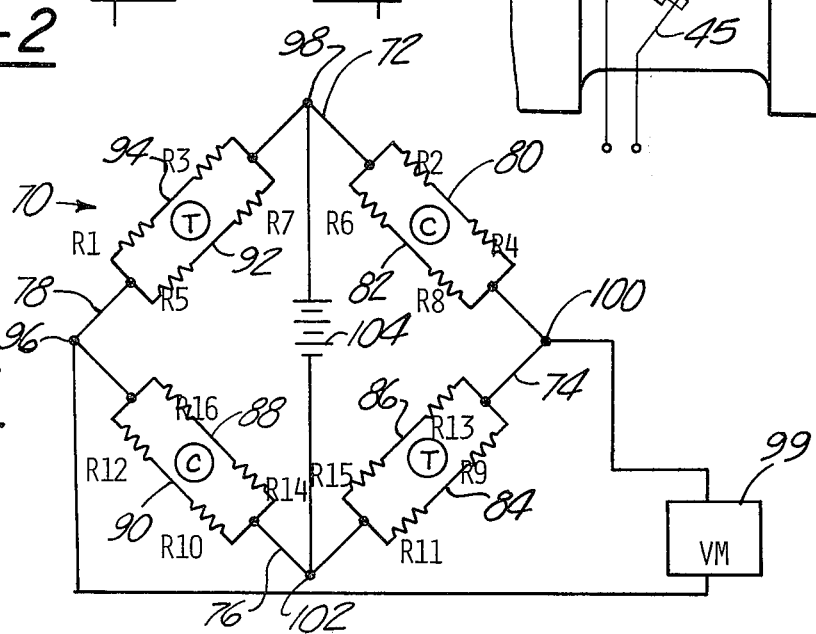

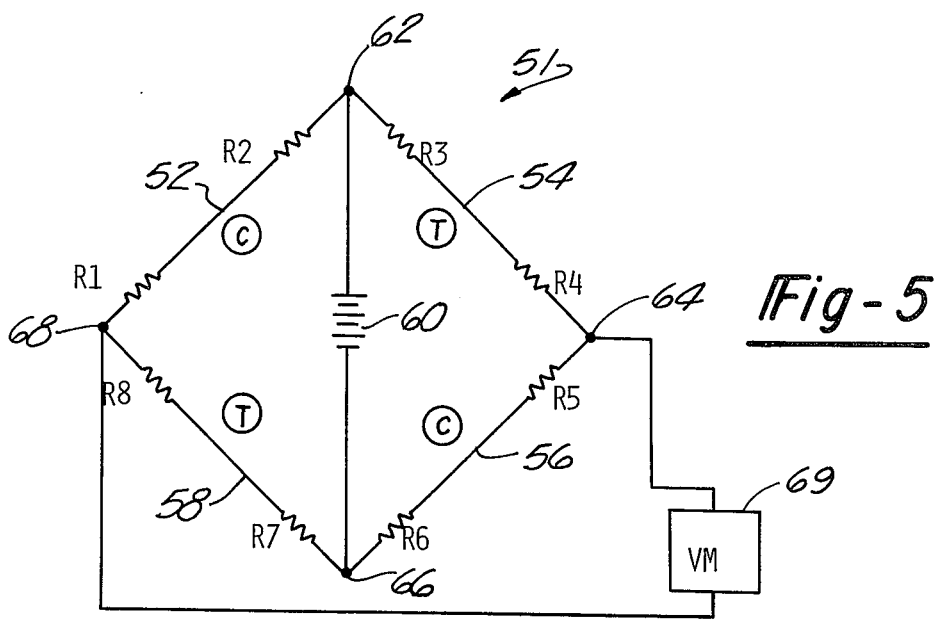
Fig-5
Fig-5a
| C1 | TOP STRUT | 32 |
| C2 | BOTTOM STRUT | 32 |
| T3 | TOP STRUT | 34 |
| T4 | BOTTOM STRUT | 34 |
| C5 | TOP STRUT | 36 |
| C6 | BOTTOM STRUT | 36 |
| T7 | TOP STRUT | 38 |
| T8 | BOTTOM STRUT | 38 |
Fig-6a
| T1C2 | OUTSIDE STRUT | 32 |
| T3C4 | INSIDE STRUT | 32 |
| T5C6 | OUTSIDE STRUT | 34 |
| T7C8 | INSIDE STRUT | 34 |
| T9C10 | OUTSIDE STRUT | 36 |
| T11C12 | INSIDE STRUT | 36 |
| T13C14 | OUTSIDE STRUT | 38 |
| T15C16 | INSIDE STRUT | 38 |
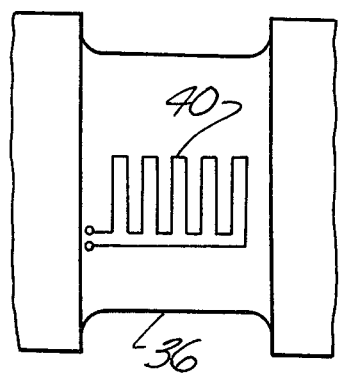
Fig-4

DRIVELINE TORQUE AND/OR THRUST SENSOR

This invention relates to force and torque transducers, commonly called load cells and torque sensors, and particularly to a sensor transducer for measuring the torque and thrust forces in a driveline system having a U-type coupling joint.

BACKGROUND OF THE INVENTION

Single and multi-axis force transducers are well known in the art and find numerous applications in situations where load and stress analyses are required. One area of interest to automotive engineers and related technologists involves drivelines for automotive vehicles such as passenger cars and trucks.

Prior art attempts to measure various driveline forces include the placing of strain gages directly on the drive shaft. This method, however, has a very low sensitivity capability and is highly inaccurate for measuring thrust forces exerted on the driveline. An alternative method involves breaking the driveline and rejoining the broken parts with a special transducer which then forms part of the line. This procedure, however, has the inherent disadvantage of producing data uncharacteristic of the typical driveline desired to be tested since it alters the physical nature of the driveline apparatus. This method is also undesirable because of its complexity and the extraneous factors which it introduces into the readings being taken.

Therefore, it is an objective of the present invention to provide a force transducer capable of accurately measuring the thrust and torque forces in a driveline without experiencing the difficulties and disadvantages of the prior art techniques.

SUMMARY OF THE INVENTION

The present invention produces a highly accurate force transducer to be disposed within the U-joint of a driveline to measure the torque and thrust stresses therein. This is accomplished by providing a force transducer which is designed to become an integral part of the driveline by replacing the standard cross element in the universal joint common to most drivelines. Thrust forces in the driveline are measured exclusively by response to shear stress, and torque forces are measured by response to tension and compression force vectors applied to sections of the sensor as described in the following presentation.

In an illustrative form hereinafter described, the invention comprises a force transducer having a substantially circular body of a high modulus of elasticity material such as steel. The body has disposed at 90° intervals along its periphery, integral connector-pivot elements extending radially therefrom. Spaced 45° from the connector elements at 90° intervals along the outer periphery of the body are strain-concentrating flexure areas of substantially reduced cross-section. Strain sensitive means, such as strain gage resistors, are disposed on the struts and interconnected in a manner hereinafter described to give the desired stress measurements. In the preferred form, the center portion of the body is relieved except for a thin section which prevents the body of the transducer from distorting in shape when subjected to a lateral force.

In the preferred embodiment, the present invention utilizes strain gage resistors to measure the torque and thrust forces in the driveline. The thrust gages are stacked or laminated in pairs on the flexure struts and interconnected in an electrical bridge network which, for each axis of sensitivity, provides accurate compensation for all unwanted force components. The result is that the network responds only the the shear force on the struts. The torque measuring gages, on the other hand, are singularly disposed on opposite surfaces of the struts and are interconnected in an electrical bridge network which responds to compression and tension forces applied to the transducer.

The force transducer of the present invention is highly sensitive and easily calibrated in a laboratory. Force information from the rotating transducer is readily conveyed to a readout station by such conventional means as slip rings or radio telemetry, well known in the art.

Various other features and advantages of the invention will become apparent from a reading of the following specification which describes the preferred embodiment of the invention in detail.

BRIEF DESCRIPTION OF THE INVENTION

FIG. 1 is a perspective view of a force transducer embodying the invention, connected in a U-joint of a driveline;

FIG. 2 is a plan view of the force transducer;

FIG. 3 is a partial section view of the force transducer of FIG. 2 taken along line 3—3.

FIG. 4 is an enlarged top view of a strut of the force transducer of FIG. 2, showing the orientation of a torque gage thereon;

FIG. 4a is a side view of the enlarged strut of FIG. 4 showing the orientation of the thrust gages thereon.

FIG. 5 is an electrical schematic diagram of a bridge network for use in connection with the strain gage resistors for measuring the torque forces applied to the transducer;

FIG. 5a is a table indicating the relation of the strain gage resistors in the circuit of FIG. 5 to the struts of the device of FIGS. 2 & 3.

FIG. 6 is an electrical schematic diagram of a bridge network for use in connection with the strain gage resistors used in measuring the thrust forces exerted on the transducer of FIG. 2;

FIG. 6a is a table indicating the relation of the strain gage resistors in the circuit of FIG. 6 to the struts in the device of FIG. 2;

DETAILED DESCRIPTION OF THE SPECIFIC EMBODIMENT

Referring to FIG. 1, a force transducer 10 embodying the invention is shown incorporated into a U-joint 12 in a driveline comprising shaft sections 14 and 16 shown connecting a motive power source M to a load L. The U-joint 12, often referred to as a Cardan joint, is commonly found in drivelines wherever some bending of the driveline is required; for example, in an automotive vehicle where the load L is a spring-suspended assembly such as a rear axle unit and the source M is an unsprung engine mounted on a frame. The U-joint 12 generally contains a standard cross element (not shown) having two sets of opposing pivots and connecting two shaft sections. In accordance with the present invention, however, the standard cross element is replaced by the force/torque transducer 10; the body of the force/torque transducer 10 comprising integral radial connecting elements 22, 24, 26 and 28 which fasten to the elements 18 and 20 extending from the shaft sections 14 and 16. Thus, the force transducer 10 becomes an integral part of the driveline without significant physical modifications to the driveline.

Referring to FIGS. 2 and 3, the force transducer 10 comprises an integral body 30 of a high modulus of elasticity material, such as steel or aluminum, and is substantially circular in shape. Extending radially from the body 30 at 90° intervals are integral connecting elements 22, 24, 26 and 28 which serve to fasten the transducer 10 to the driveline in the manner described with reference to FIG. 1.

Spaced 45° from the connecting elements 22, 24, 26 and 28 and at 90° intervals along the periphery of the body 30, are stress-concentrating struts 32, 34, 36 and 38 providing flexure areas of greatly reduced cross-section. Rounded rectangular holes 31, 33, 35 and 37 are formed in and through the body 30 radially adjacent the inner side of the struts 32, 34, 36 and 38 respectively, leaving the struts to form a neck or bridge between the four major sectors of the body 30 of the transducer 10. A circular center area of body 30 is relieved by face grinding on both sides to form a thin center section 39 best shown in FIG. 3. This adds substantial lateral (radial) stiffness and, although preferable, is not essential.

Disposed on the top and bottom surfaces of the struts 32, 34, 36 and 38 are strain sensitive means, preferably strain gage resistors, (40 and 42 in FIGS. 2 and 3 being representative thereof), for measuring the torque force exerted on the transducer 10. FIG. 4 is provided as an enlarged view of a portion of the body 30 to show the orientation of the strain gage resistor 40 on the strut 36. Strain gage resistor 40 is a convention strain-sensitive "rosette" suitably bonded to the surface of the strut 36 with its principal axis of sensitivity disposed parallel to the axis of the strut 36.

The torque-sensing strain gages, 40 and 42 being representative thereof, are interconnected in an electrical bridge network, as hereinafter described in greater detail, and are responsive to the tension and compression forces in the transducer 10 during the transmission of power from source M to load L. To illustrate this point, assume that the transducer 10 of FIG. 2 is connected to a driveline with the driving shaft 14 fastened to connecting elements 22 and 24 and extending below and substantially perpendicular to the plane of the paper, and the driven shaft 16 is fastened to connecting elements 26 and 28 and extends above and perpendicular to the plane of the paper. If the driving shaft 14 is rotated counterclockwise with reference to FIG. 2, the strain gage resistors disposed on the top and bottom surfaces of struts 34 and 38 respond to compressive forces exerted thereon, while the strain gage resistors disposed on the top and bottom surfaces of struts 32 and 36 respond to the tension forces. If the driving shaft 14 is rotated clockwise, the opposite condition obtains.

As will be apparent to those of ordinary skill in the strain measurement art, to measure the variations in these electrical resistances, the well known Wheatstone bridge is commonly employed; the network 51 illustrated in FIG. 5 being a variation thereof. Referring to FIG. 5, bridge network 51 comprises legs 52, 54, 56 and 58 each of which comprises a pair of series connected resistors. Leg 52, for example, comprises the series resistors C1 and C2. Similarly, leg 54 comprises series resistors T3 and T4, and so on.

A table illustrated in FIG. 5a correlates the location of the resistors in network 51 with the physical location thereof on the transducer body 30 shown in FIGS. 2 and 3. Thus, as will readily be understood, resistors C5 and C6, for example, correspond to strain gage resistors 40 and 42 disposed on strut 36.

Each individual strain gage resistor is normally of the same value; e.g., 350 ohms, and therefore each leg of the bridge network 51 has a total nominal resistance of 700 ohms when the transducer body 30 is in the unstressed condition. A dc source 60, normally between 10 and 20 volts, is connected between terminals 62 and 66 of the bridge network 51. The output of the network 51 is taken across terminals 64 and 68 and is connected to a voltmeter 69. Thus, as the individual resistances change in response to compression and tension in the transducer body 30, an unbalanced condition will occur in the legs 52, 54, 56 and 58 of the bridge network 51, thereby producing a reading on the voltmeter 69. As will be apparent to those skilled in the art, these voltage readings can be readily converted into appropriate torque units, such as foot-pounds.

Returning to FIG. 1, to measure the thrust forces exerted parallel to the axis of the driveline, strain gage resistors, as best illustrated in FIGS. 2 and 3, are disposed on the inside and outside surfaces of the struts 32, 34, 36 and 38; resistor pairs 44, 45, and 46, 47 being representative thereof. Looking to FIG. 4a the preferred arrangement for the pair of strain gage resistors 44 and 45 on strut 36 is shown. Strain gage resistors 44 and 45 are also of the strain-sensitive rosette type referred to above. The surface of strut 36, illustrated in FIG. 4a is the same as appears in FIG. 3, and is to be taken as representative of the preferred strain gage resistor configuration on each of the struts 32, 34, 36 and 38. Likewise, similar strain gage resistor arrangements are found on the opposite surfaces of struts 32, 34, 36 and 38, such that eight individual pairs of strain gage resistors are employed to measure the thrust component of force exerted on the transducer 10.

Referring again to FIG. 4a, strain gage resistor pair 44 and 45 is disposed on the surface of strut 36 so as to respond only to shear stress which is produced in the strut 36 parallel to the axis of the driveline. Strain gage resistor 44 is suitably bonded to strut 36 with its principal axis of sensitivity disposed at a 45° angle with reference to the axis of the driveline. Strain gage resistor 45 is disposed immediately over strain gage resistor 44, and has its principal axis of sensitivity oriented 90° relative to the axis of sensitivity of strain gage resistor 44. The two strain gage resistors are laminated over one another by means of an insulating material, such as varnish or epoxy. As previously mentioned, a second laminated pair of mutually orthogonal strain gage resistors 46 and 47 is disposed on the opposite side of strut 36 and analogously, on the corresponding surfaces of struts 32, 34 and 38. The use of two or more "shear struts" in multi-component force/moment sensors is clearly described in the inventors previously issued U.S. Pat. No. 3,771,359.

Referring now to FIG. 6, the electrical circuit configuration for the eight pairs of strain gage resistors on struts 32, 34, 36 and 38, for measurement of thrust forces along the axis of the driveline, is shown. Again, the circuit configuration utilized is a variation of the well-known Wheatstone bridge. Bridge network 70 comprises legs 72, 74, 76 and 78, each of which comprises a pair of parallel-connected resistive paths. Leg 72, for example, comprises path 80 consisting of series-resistors C2 and C4, in parallel with path 82 consisting of series-resistors C6 and C8. Similarly, leg 74 comprises parallel paths 84 and 86 consisting of series resistors T9, T11, T13, and T15, respectively.

The table in FIG. 6a correlates the location of the individual resistive elements in bridge network 70 with their physical arrangement on the transducer body 30, shown in FIGS. 2 and 3. As can readily be seen, resistors T9 and C10 of bridge network 70 correspond to strain gage resistors 44 and 45 on strut 36 of the transducer body 30, illustrated in FIG. 2.

As was the case with the bridge network 51 of FIG. 5, the individual strain gage resistors of bridge network 70 are normally of the same value; e.g., 350 ohms, and therefore, each leg 72, 74, 76 and 78 has a total nominal resistance of 350 ohms when the transducer body 30 is in the unstrained condition.

A dc source 104, typically between 10 and 20 volts, is connected between terminals 98 and 102 of the bridge network 70. The output from the network is taken across terminals 96 and 100 and connected to a voltmeter 99. Thus, as the resistance values of the individual strain gage resistors vary in response to stresses applied to the transducer body 30, an unbalanced condition occurs in the bridge network 70 which produces a reading on the voltmeter 99. As before, this voltage reading is easily converted into force measurement units.

It can be seen that the tension and compression forces exerted on the transducer body 30 and monitored by bridge network 51 of FIG. 5 to measure torque, have no effect on the bridge network 70 of FIG. 6. This is because each leg 72, 74, 76, and 78 of the bridge network 70 contains a pair of strain gage resistors disposed on the inside and outside surfaces of a strut under tension and a pair of strain gage resistors disposed on the inside and outside surfaces of a strut under compression. Thus, as one resistive element increases in value, another decreases by a corresponding amount, thereby maintaining the balance of the bridge network 70 of FIG. 6. A similar analysis obtains for tortional and bending loads on each of the struts 32, 34, 36 and 38.

Accordingly, the bridge network 70 of FIG. 6, in operative association with the physical arrangement of the transducer body 30 and its disposition within the driveline of FIG. 1, produces a force transducer which accurately measures thrust forces applied parallel to the axis of the driveline as a function of shear stress.

In summary, it has been shown that a simple, effective and highly accurate force transducer has been disclosed which is easily calibrated to measure thrust and torque forces exerted on a driveline. The transducer is designed to replace the standard cross element in a U-type coupling joint common to most drivelines. The transducer thus becomes an integral part of the driveline, thereby rendering the accuracy of the device possible, without significantly modifying the physical characteristics of the driveline. Moreover, the transducer of the present invention may be removed from one driveline and placed in another of similar design. The transducer is responsive to tension and compression force vectors for measuring the torque applied to the driveline, and monitors the thrust component of force as a function of shear stress. As will be apparent to those skilled in the art, the force information thereby produced can be transmitted from the transducer by such conventional means as slip rings or radio telemetry.

The embodiments of the invention in which an exclusive property or privilege is claimed are defined as follows:

1. A force measurement transducer for an automotive driveline of the type comprising plural shaft sections:
an integral body of high modulus of elasticity material having a substantially annular configuration, said body including four uniformly spaced rigid sectors conjoined by flexure struts of substantially lesser cross-section than said sectors, each of said struts being oriented at right angles to the two next adjacent struts,
first and second oppositely radially extending connector elements integral with first and second diametrically opposite sectors, respectively, for pivotally securing said transducer to one driveline shaft section,
third and fourth oppositely radially extending connector elements integral with third and fourth diametrically opposite sectors, respectively, for pivotally securing said transducer to another driveline shaft section,
said transducer body being of such dimension as to fit substantially within the cross-sectional area of said shaft sections whereby said transducer body is capable of acting as a cross-member of the universal joint in said driveline,
and strain gage resistor means mounted on said flexure struts and electrically interconnected to produce an output quantity representing forces in said transducer body caused by operation of said driveline.

2. Apparatus as defined in claim 1 wherein said body comprises a thin central web integral with and connected to said sectors and lying in a plane defined by the center lines of said diametrically opposite connector elements, said web being substantially thinner than said sectors, said body being provided with apertures between said flexure struts and said web to isolate the flexure areas.

3. Apparatus as defined in claim 1 wherein said strain gage resistor means are disposed on said flexure struts in such orientation as to be responsive to torque transmitted through said body.

4. Apparatus as defined in claim 1 wherein said strain gage resistor means are oriented on said flexure struts in such configuration as to be responsive to thrust transmitted through said body.

5. An automotive driveline comprising:
a first shaft section having diametrically opposite connector members,
a second shaft section having diametrically opposite connector members,
and a force measuring transducer body providing a universal joint connection between the first and second shaft sections and comprising an integral body of high modulus of elasticity material having a substantially annular configuration,
said body including four uniformly spaced rigid sectors conjoined by flexure struts of substantially lesser cross-section than said sectors, each of said struts being oriented at right angles to the two next adjacent struts,
first and second oppositely radially extending connector elements integral with first and second diametrically opposite sectors, respectively, and pivotally secured to said connector members of the first shaft section, third and fourth oppositely radially extending connector elements integral with third and fourth of said sectors, respectively, and pivotally secured to the connector members of the other of said first and second shaft sections whereby said transducer body acts as a cross-member of a universal joint in said driveline, and strain gage resistor means mounted on said flexure struts and electrically interconnected to produce an output quantity representing forces in said transducer body caused by operation of said driveline between a rotary power source and a load.

6. Apparatus as defined in claim 5 wherein said transducer body further comprises a web of thin cross-section material integral with and connected to each of said four sectors and lying in a plane common to the centerlines of diametrically opposite connector elements to radially stiffen said body, apertures being formed in said body mediate said flexure struts and said web to isolate said flexure struts therefrom.

7. Apparatus as defined in claim 5 wherein said strain gage resistor means are disposed on said flexure struts so as to be responsive to torque in said body.

8. Apparatus as defined in claim 5 wherein said strain gage resistor means are oriented on said flexure struts so as to be responsive to thrust transmitted through said body from one shaft section to another.

* * * * *